(12) United States Patent
Yacobi et al.

(10) Patent No.: US 6,260,865 B1
(45) Date of Patent: Jul. 17, 2001

(54) TOOL HOLDER

(75) Inventors: Michael S. Yacobi, Powell; Thomas Parker, Columbus; Steven Courtney, Powell, all of OH (US)

(73) Assignee: Union Tools, Inc., Columbus, OH (US)

( * ) Notice: Subject to any disclaimer, the term of this patent is extended or adjusted under 35 U.S.C. 154(b) by 0 days.

(21) Appl. No.: 09/241,371

(22) Filed: Feb. 2, 1999

(51) Int. Cl.⁷ ....................................................... B62B 3/00
(52) U.S. Cl. ................................... 280/47.34; 280/47.17; 280/47.19; 280/47.24; 280/47.35; 280/79.11; 280/79.3; 248/346.01; 248/346.02
(58) Field of Search .................. 280/47.17, 47.19, 280/47.24, 47.27, 47.34, 47.35, 79.11, 79.3; 248/346.02, 346.01, 678, 311

(56) References Cited

U.S. PATENT DOCUMENTS

| | | | |
|---|---|---|---|
| 1,925,613 | * | 9/1933 | Stanger . |
| 2,181,438 | | 11/1939 | Peet . |
| 2,480,597 | * | 8/1949 | Nelson . |
| 2,533,541 | * | 12/1950 | Warring ............................. 280/41.17 |
| 2,590,154 | * | 3/1952 | Burns ................................ 280/41.19 |
| 2,596,749 | | 5/1952 | Webber . |
| 2,623,642 | * | 12/1952 | Looney ............................. 280/47.27 |
| 2,676,710 | | 4/1954 | Williamson . |
| 2,757,012 | * | 7/1956 | Leffler ............................... 280/47.34 |
| 2,835,503 | | 5/1958 | Humphries et al. . |
| 2,957,700 | * | 10/1960 | Beaurline . |
| 3,164,393 | * | 1/1965 | Upham, II . |
| 3,531,136 | * | 9/1970 | Mobley ............................. 280/41.19 |
| 3,869,137 | | 3/1975 | Byrom . |
| 3,894,748 | | 7/1975 | Ratcliff . |
| 4,126,327 | | 11/1978 | Taber . |
| 4,134,499 | | 1/1979 | Joswig . |
| 4,743,040 | | 5/1988 | Breveglieri et al. . |
| 4,793,508 | * | 12/1988 | Thompson . |
| 4,923,202 | | 5/1990 | Breveglieri et al. . |
| 5,704,496 | | 1/1998 | Latta . |
| 5,833,250 | * | 11/1998 | Schier et al. .................. 280/47.19 X |
| 5,865,412 | * | 2/1999 | Mason .............................. 248/311.2 |
| 5,887,878 | * | 3/1999 | Tisbo et al. ...................... 280/47.19 |
| 5,938,160 | * | 8/1999 | Hartman et al. ................. 248/311.2 |
| 6,003,884 | * | 12/1999 | Chang .............................. 280/47.24 |
| 6,050,576 | * | 4/2000 | Tanner et al. .................... 280/47.26 |

* cited by examiner

*Primary Examiner*—Lanna Mai
*Assistant Examiner*—Toan C To
(74) *Attorney, Agent, or Firm*—Brobeck, Phleger & Harrison LLP

(57) ABSTRACT

The invention includes a tool holder for at least one tool having a working end and a handle. The tool holder comprises a gripping device for the handle of the at least one tool, a base for supporting the working end of the at least one tool, and a substantially vertical structural support connected to the gripping device and the base for supporting the gripping device vertically upward from the base. The base includes an irregular surface for contacting an edge of the working end of the at least one tool, thereby restricting movement of the working end of the at least one tool along the base.

12 Claims, 4 Drawing Sheets

TOOL HOLDER

BACKGROUND OF THE INVENTION

1. Field of the Invention

The present invention relates to a tool holder. More particularly, the present invention relates to a tool holder which is easily transported and provides a stable support for holding tools of many shapes and sizes.

2. Description of Related Art

In recent years, the shape of tools and their handles have evolved to be increasingly ergonomic, such that tools no longer have standard shapes and sizes. As a result, conventional tool holders typically are not capable of accommodating the large variety of tool configurations which are now commercially available. Known tool holders capable of transporting even a limited variety of current styles of tools are large and burdensome to transport across the uneven terrain of a typical yard, even when provided with wheels for easy transport. Indeed, tool holders with wheels generally require the user to bend down and apply a wheel brake to keep the tool holder from rolling when not in use. As a result, some users forget to apply the brake, others are unable to apply the brake, and still others find such devices to be unduly cumbersome to operate.

Securing a tool in a conventional tool holder often requires insertion of the tool handle through a circular hole. Once inserted, the working surface of the tool is positioned at the top of the tool holder where it could cause harm to the tool holder user. Additionally, in order for such a hole to be large enough to accommodate all tool handle shapes and sizes, smaller tools may have too much play within the hole and therefore become noisy and perhaps even dangerously unstable.

Some conventional tool holders use resilient strips of plastic material in combination with foam inserts to create a resilient and adjustable tool handle holder. Although these tool holders allow for the working surface of the tool to rest on the cart's base portion, their tool handle holders are not sufficiently strong to hold many large heavy tools such as shovels. Additionally, while such tool holders provide increased safety for the user, they lack an acceptable mechanism to keep the working surface of the tool from moving around on the base. Movement of the working surface of the tool on the base lessens stability of the tool which is prone to slide around in the cart or become loose and fall from the cart. The base of conventional tool holders also tends to lack sufficient drainage for liquid and the debris which usually accumulate on tools.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention includes a tool holder for at least one tool having a working end and a handle. The tool holder comprises a gripping device for the handle of the at least one tool, a base for supporting the working end of the at least one tool, and a substantially vertical structural support connected to the gripping device and the base for supporting the gripping device vertically upward from the base. The base includes an irregular surface for contacting an edge of the working end of the at least one tool, thereby restricting movement of the working end of the at least one tool along the base.

In another aspect, the advantages and purpose of the present invention are attained by a tool cart for at least one tool having a working end and a handle. The tool cart comprises a gripping device for the handle of the at least one tool, a base for supporting the working end of the at least one tool, a substantially vertical structural support connected to the gripping device and the base for supporting the gripping device vertically upward from the base, and means for facilitating movement of the tool cart. The base includes an irregular surface for contacting an edge of the working end of the at least one tool, thereby restricting movement of the working end along the base, and the substantially vertical structural support may extend upwardly from the base at about a 5°–15° incline to the vertical direction.

In still another aspect, the advantages and purpose of the present invention are attained by a tool holder comprising a base having an irregular surface, at least one support bar extending substantially vertically and upward from the base, a substantially horizontal handle attached to the at least one support bar, a substantially horizontal upper crossbar attached to the at least one support bar, and a substantially horizontal lower crossbar attached to the at least one support bar. A first rack comprising a series of adjacent clamps is attached to the upper crossbar. A second rack comprising a series of adjacent notches is attached to the lower crossbar. The notches are substantially vertically aligned with the clamps to effectively hold the handle of the at least one tool.

Both the foregoing general description and the following detailed description are exemplary and explanatory only and are not restrictive of the invention, as claimed.

BRIEF DESCRIPTION OF THE DRAWINGS

The accompanying drawings, which are incorporated into and constitute part of the specification, illustrate a presently preferred embodiment of the invention and together with the description, serve to explain the principles of the invention. In the drawings.

DESCRIPTION OF THE PREFERRED EMBODIMENTS

Reference now will be made in detail to the present preferred embodiments of the invention, examples of which are illustrated in the accompanying drawings. Wherever possible, the same reference numbers are used throughout the drawings to refer to the same or like parts.

The invention includes a tool holder for at least one tool having a working end and a handle. The tool holder comprises a gripping device for the handle of the at least one tool, a base for supporting the working end of the at least one tool, and a substantially vertical structural support connected to the gripping device and the base for supporting the gripping device vertically upward from the base. The base includes an irregular surface for contacting an edge of the working end of the at least one tool, thereby restricting movement of the working end of the at least one tool along the base.

Figure 1:
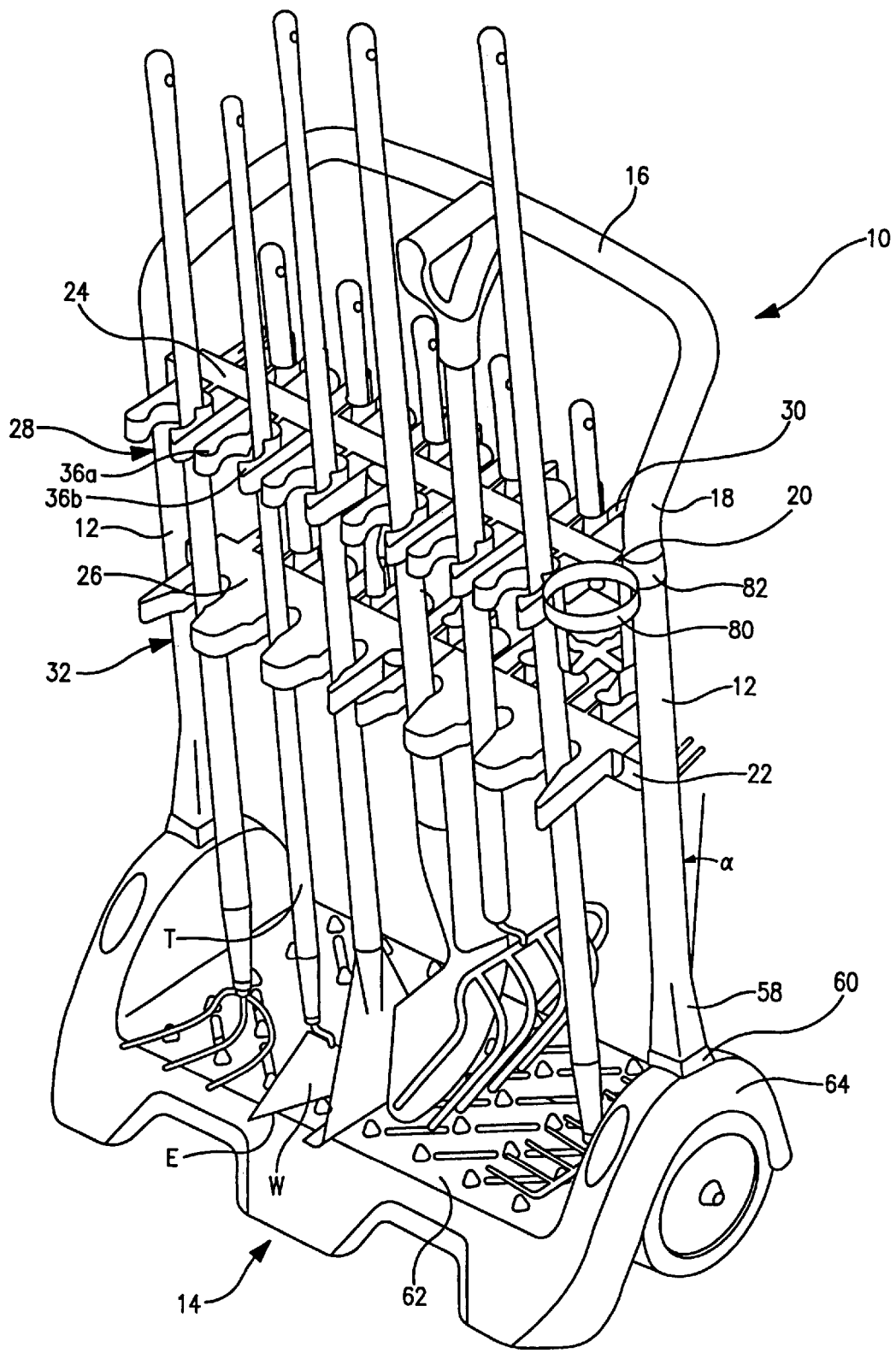
FIG. 1 is a perspective view of a tool holder of the present invention depicted in use, holding a variety of tool shapes and sizes.
Figure 2:
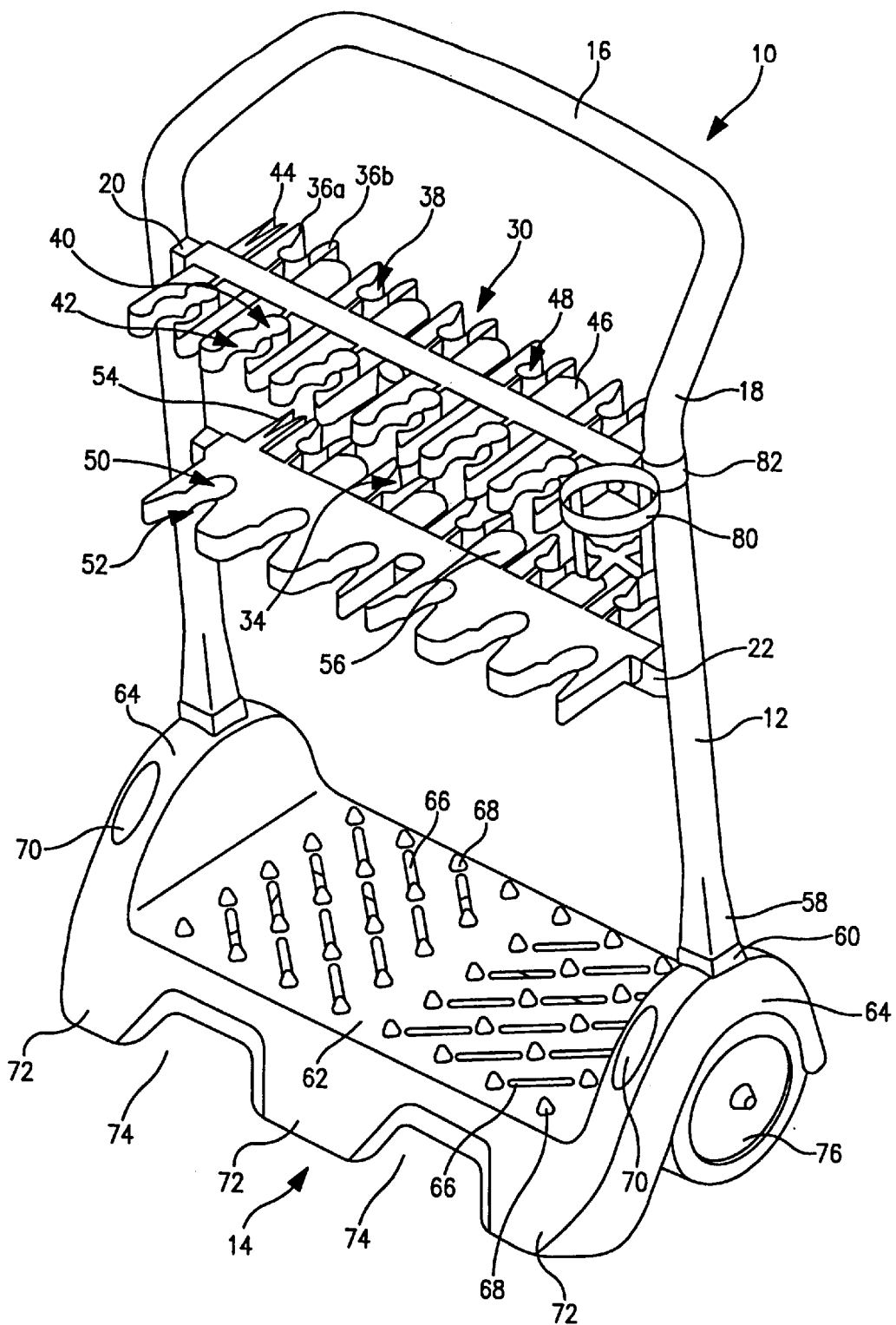
FIG. 2 is a perspective view of the tool holder of the present invention which is not holding any tools.

FIGS. 1 and 2 illustrate an embodiment of the tool holder of the present invention, identified generally with reference numeral 10. Tool holder 10, illustrated as a tool cart, includes structural support bars 12 removably or permanently attached to a base 14. Permanent attachment may be achieved, for example, by molding, gluing or welding support bars 12 to base 14. Removable attachment may be achieved by, for example, screwing, snap-fitting or friction-fitting the support bars 12 to the base 14. Support bars 12 extend upward from base 14, preferably at an angle α of about 5–10° from the vertical, more preferably about 7° from the vertical. Support bars 12 preferably comprise cylindrical tubes of a suitably strong and durable material such as a preformed plastic. The cylindrical tubes are either hollow or solid. Support bars 12 may alternatively have a square or other polygonal shape.

A handle 16 extends substantially horizontally between support bars 12, at a position which allows a user of tool holder 10 to easily hold and guide tool holder 10. Curved portions 18 extend between each support bar 12 and handle 16 to ensure desirable positioning of handle 16. Handle 16 and curved portions 18 preferably comprise cylindrical tubes of a suitably strong and durable material such as a preformed plastic. The cylindrical tubes are either hollow or solid. Handle 16 and curved portions 18 may alternatively have a square or other polygonal shape. Support bars 12, curved portions 18 and handle 16 are preferably formed as a single piece.

An upper crossbar 20 and a lower crossbar 22 extend substantially horizontally between support bars 12 and enhance sturdiness of the overall frame of tool holder 10. Upper and lower crossbars 20, 22 preferably comprise cylindrical tubes of a suitably strong and durable material such as a preformed plastic. The cylindrical tubes are either hollow or solid. Upper and lower crossbars 20,22 may alternatively have a square or other polygonal shape. Upper and lower crossbars 20, 22 are preferably formed as a single piece with support bars 12. An alternative embodiment of the invention (not shown) utilizes a single support bar extending from base 14 to support upper and lower crossbars 20, 22 and handle 16. A gripping device 24 is attached to the upper crossbar 20 and an alignment device 26 is attached to the lower crossbar 22. Gripping device 24 preferably comprises a rack having a series of adjacent clamps 28 extending toward the front side of the cart and a series of adjacent clamps 30 extending toward the rear side of the cart which effectively grip the handle of a tool inserted in tool holder 10. Alignment device 26 preferably comprises a rack having a series of adjacent notches 32 extending toward the front side of the cart and a series of adjacent notches 34 extending toward a rear side of the cart. Notches 32, 34 are aligned with clamps 28, 30 to provide additional support for the handle of tools held by clamps 28, 30.

Gripping device 24 comprise a suitably strong, flexible, resilient and durable material, preferably a preformed plastic. Alignment device 26 comprises a suitably strong and durable material, preferably a preformed plastic. Gripping device 24 can be either permanently or removably attached to upper crossbar 20. Alignment device 26 can be either permanently or removably attached to lower crossbar 22. Permanent attachment may be achieved by, for example, integral molding, gluing or welding the devices to their respective crossbars. Removable attachment may be achieved by, for example, screwing, snap-fitting or friction-fitting the devices to their respective crossbars.

In the illustrated embodiment of the invention, gripping device 24 includes front and rear clamps 28, 30. Each clamp 28, 30 comprises two flexible, resilient clamp arms 36a, 36b. Clamp arms 36a, 36b are generally C-shaped, and each clamp 28, 30 includes at least one clamping area 38, 40, 42 having a substantially circular cross-section. Clamp arms 36a, 36b are preferably hollow to increase resiliency of the clamp and lower material costs, but may also be solid.

FIGS. 1 and 2 illustrate adjacent clamps 28 which extend toward the front of the tool holder 10 and have clamp arms 36a, 36b defining two adjacent clamping areas 40,42. A narrow clamping area 40 is preferably defined at an inner position of the clamp 28, and a wide clamping area 42 is preferably defined at an outer position of the clamp 28. The positions of wide and narrow clamping areas 40, 42 may alternatively be reversed. FIGS. 1 and 2 also illustrate adjacent clamps 30 which extend toward the rear of tool holder 10 and have clamp arms 36a, 36b which define a single clamping area 38. Each of the above-described clamping areas 38,40,42 preferably has a different size so that tool holder 10 can accommodate a wide variety of tool handle shapes and sizes. Gripping device 24 may additionally include a mini-clamp 44 to hold such items as a towel or rag, and openings 46 for accommodating tools having handles which are too large for the clamps 28.

In the illustrated embodiment of the invention, alignment device 26 includes front and rear notches 32, 34. Each notch 32, 34 has at least one notch area 48, 50, 52. The notches 32 extending toward the front of the tool holder define two adjacent notch areas, 48, 50. A narrow notch area 50 is preferably defined at an inner position of the notch 32, and a wide notch area 52 is preferably defined at an outer position of the notch 32. The positions of wide and narrow notch areas 48, 50 may alternatively be reversed. Adjacent notches 34 extend toward the rear of tool holder 10 and define a single notch area 48. The notch areas 48, 50, 52 are substantially vertically aligned with their respective clamping areas 38, 40, 42, respectively, in order to effectively hold a tool in tool holder 10. In addition, notch areas 48, 50, 52 preferably are substantially the same size as clamping areas 38,40,42. In the illustrated embodiment of the invention, alignment device 26 additionally includes a mini-clamp 54 to hold such items as a towel or rag, and openings 56, aligned with openings 46, for accommodating large tool handles. Notches 32, 34 may be replaced by clamps in alternative embodiments of the tool holder.

As can be seen in FIGS. 1 and 2, in the preferred embodiment of the invention support bars 12 have a substantially square cross-section at their bottom 58 and are received in substantially square receptors 60 of base 14. The square shape of support bar bottoms 58 and base receptors 60 provides a desirable attachment between support bars 12 and base 14 by preventing undesirable rotation of support bars 12 when inserted into base receptors 60. The shape of shape of support bar bottoms 58 and base receptors 60 may alternatively be any polygonal shape which prevents rotation of support bars 12 when inserted into receptors 60, or could even be round if rotation of support bars 12 in base receptors 60 was not a concern.

Figure 3:
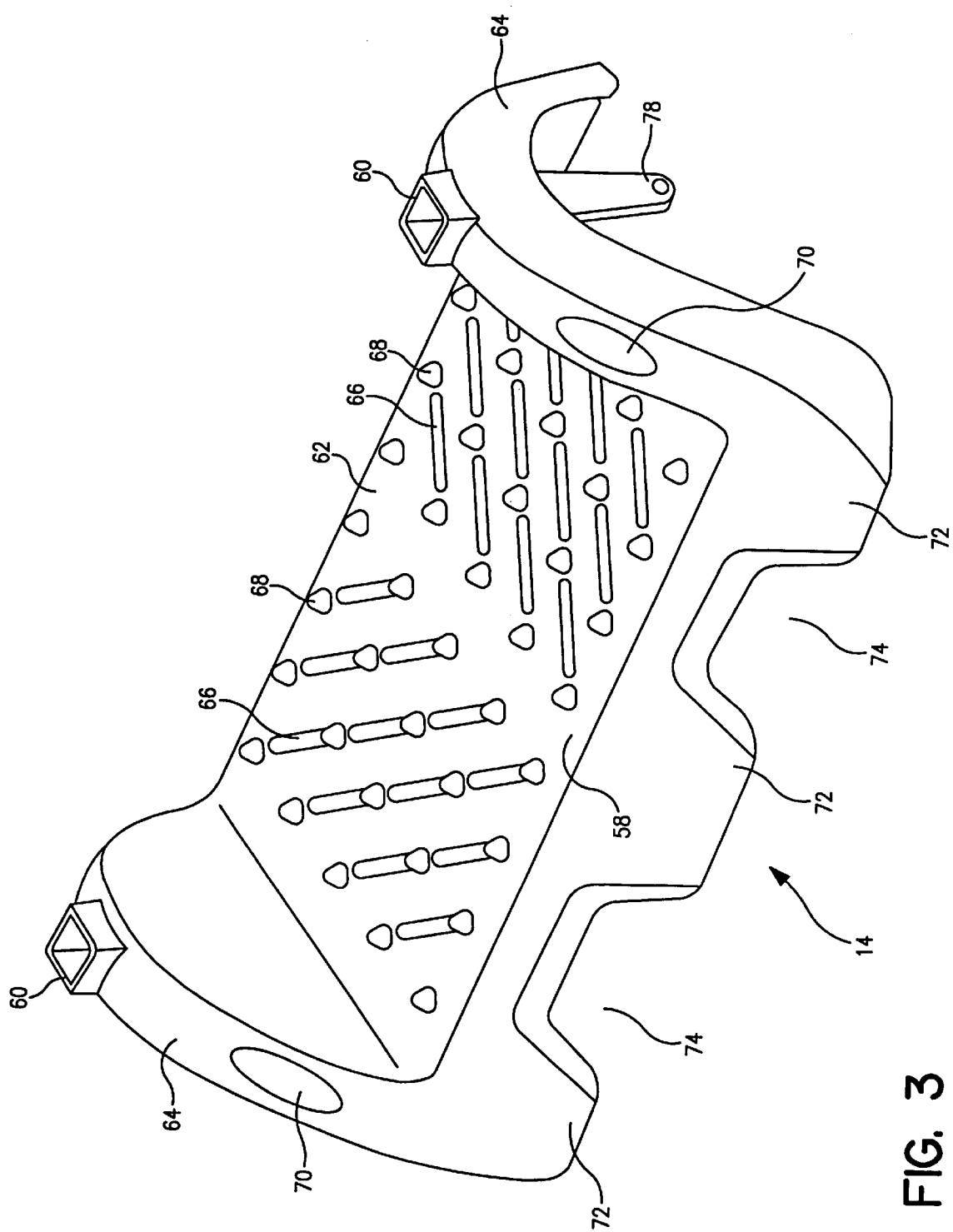
FIG. 3 is a perspective view of a first embodiment of the base of the tool holder of the present invention.

A first embodiment of a base of the present invention is shown in FIGS. 1 through 3. Base 14 comprises a tool retaining surface 62 extending between two raised arcuate wheel wells 64. Support bar receptors 60 are preferably located at an uppermost portion of each wheel well 64. Tool retaining surface 62 is substantially planar and rectangular, and has an irregular surface which contacts an edge E of a working end W of a tool T to restrict movement of working end W of tool T along base 14. As illustrated, tool retaining surface 62 includes an arrangement of slots 66 and protuberances 68. Slots 66 and protuberances 68 are arranged in alternating rows along base 14. In use, each row may accommodate a separate tool. On a left side of base 14, there is a first patterned area including four rows of conical protuberances 68 between which, left to right, three rows of elongate slots 66 are provided. Similarly, on a right side of base 14 there is a second patterned area including four rows of conical protuberances 68 between which, left to right, three rows of elongate slots 66 are provided. Although slots 66 are shown to extend diagonally on base 14, they may extend in any orientation on base 14.

A groove 70 extends into each wheel well 64. Grooves 70 are advantageous because they allow stacking of tool holders for shipping and storage. Support feet 72 extend at an angle downward from tool retaining surface 62. In a preferred embodiment, tool holder 10 includes three support feet 72 separated by cut-out portions 74. Cut-out portions 74 are advantageous because they reduce material costs and provide a more appealing appearance of tool holder 10.

Wheels 76, which facilitate movement of tool holder 10, are pivotally attached to base 14 in a known manner. Multi-directional rollers are alternatively contemplated as a means to facilitate movement of tool holder 10. As can be seen in FIG. 3, axle supports 78 extend from the base 14 to support an axle (not shown) to which wheels 76 are pivotally attached.

Figure 4:
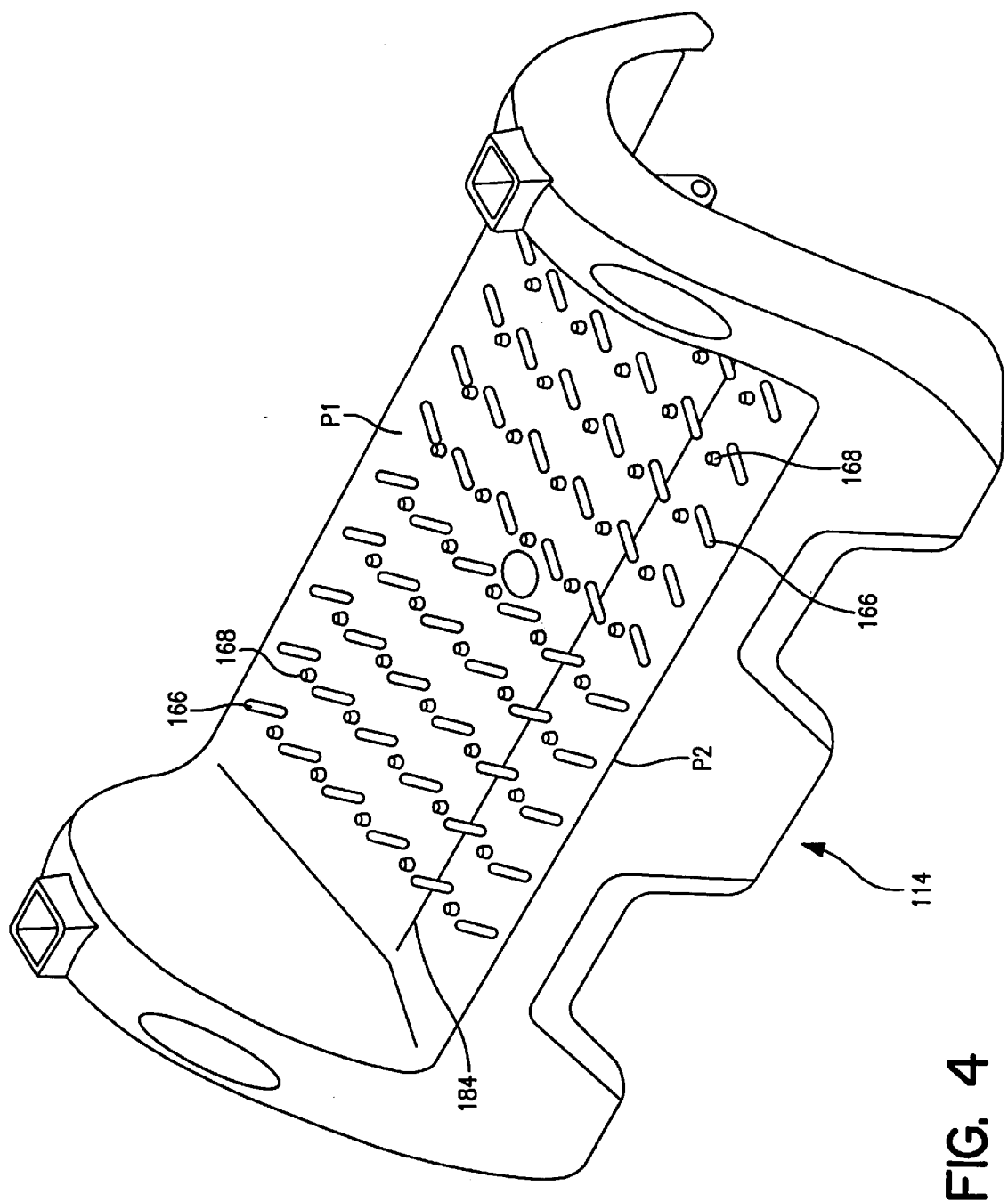
FIG. 4 is a perspective view of a second embodiment of the base of the tool holder of the present invention.

A second embodiment of a base of the present invention is shown in FIG. 4. Base 114 has two substantially planar portions P1 and P2 which descend to and meet at a line 184 which is preferably the lowermost portion of base 114. The irregular surface of base 114 includes slots 166 and protuberances 168 arranged in alternatingly spaced rows along both planar portions P1, P2 of base 114. On a left side of base 114 there is a first patterned area including six rows of elongate slots 166 between which, front to back, five rows of cylindrical protuberances 168 are provided. Similarly, on a left side of base 114 there is a second patterned area including six rows of elongate slots 166 between which, front to back, five rows of cylindrical protuberances 168 are provided. Although slots 166 are shown to extend diagonally on the base 114, they may extend in any orientation on base 114.

The irregular surface of first and second embodiments of base 14, 114 keeps the working surface of tools from moving around on the base to increase stability of tools held in the cart. In addition, the slots provide adequate drainage to prevent the liquid and the debris which usually accumulates on tools from building up on the base.

A cup holder 80 is optionally provided on tool holder 10. Cup holder 80 is preferably attached to one of the support bars 12 by an attachment ring 82. Attachment ring 82 may be either removably or permanently attached to support bar 12. Permanent attachment may be achieved by, for example, molding, gluing or welding attachment ring 82 to support bar 12. Removable attachment may be achieved by, for example, screwing, snap-fitting or friction-fitting attachment ring 82 to support bar 12. Alternatively, cup holder 80 may be provided on one of upper and lower crossbars 20, 22.

As shown in FIGS. 1 and 2, in an illustrated embodiment of the invention, support bars 12 extend from base 14 at an incline angle α of about 5–10° from the vertical. Support bars 12 more preferably extend at an incline angle α of about 7° from the vertical, and are offset from the vertical toward a front of tool holder 10 (i.e., away from handle 16). Such an offset angle α causes tool holder 10 to lean toward its front and rest stably on its support feet 72. In addition, offset angle α of support bars 12 causes the tool handle to be tilted away from tool holder handle 16 and therefore away from the operator pushing tool holder 10, thereby increasing operator safety.

It will be apparent to those skilled in the art that various modifications and variations can be made in the tool holder of the present invention and in construction of the tool holder without departing from the scope and spirit of the invention. As an example, the tool holder of the present invention may have any pattern of slots and protuberances which allow the base to effectively hold tools with a variety of working edge shapes and sizes. In addition, the tool holder may be made without an alignment device or with only a single support bar. Further, the device may hold tools on only one side, and need not have wheels.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed:

1. A tool cart for at least one tool having a working end and a handle, the tool cart comprising:
   a gripping device adapted to engage the handle of the at least one tool;
   a base adapted to support the working end of the at least one tool the base comprising:
      an irregular surface adapted to contact an edge of the working end of the at least one tool, thereby restricting movement of the working end along said base; and
      a plurality of arcuate wheel wells having an oval groove extending thereinto;
   a substantially vertical structural support connected to said gripping device and said base for supporting said gripping device vertically upward from said base; and
   means for facilitating movement of the tool cart disposed beneath the wheel wells.

2. The tool cart of claim 1, wherein said means for facilitating movement of the tool cart includes wheels disposed beneath said base.

3. The tool cart of claim 1, wherein said means for facilitating movement of the tool cart includes multidirectional rollers pivotally attached beneath said base.

4. A tool holder for at least one tool having a working end and a handle, the tool holder comprising:
   a base having an irregular surface;
   at least one support bar extending substantially vertically and upward from said base;
   a horizontal handle attached to said at least one support bar;
   a substantially horizontal upper crossbar attached to said at least one support bar;
   a gripping device comprising a series of adjacent clamps attached to said upper crossbar;
   a substantially horizontal lower crossbar attached to said at least one support bar; and
   an alignment device comprising a series of adjacent notches attached to said lower crossbar, wherein a plurality of said clamps have a wide clamping area and a narrow clamping area spaced along a length of said clamps, and a plurality of said notches have a wide notch area substantially vertically aligned with said wide clamping area and a narrow notch area substantially vertically aligned with said narrow clamping area.

5. The tool holder of claim 4, wherein said irregular surface of said base comprises rows of projections and slots which are located at substantially alternating positions along said base.

6. The tool holder claim 4, wherein said irregular surface includes two patterned areas, and wherein each patterned area includes four rows of conical protuberances between which three rows of elongate slots are provided.

7. The tool holder of claim 4, wherein said irregular surface includes two patterned areas, and wherein each patterned area includes six rows of elongate slots between which five rows of cylindrical protuberances are provided.

8. An apparatus as claimed in claimed in claim 4, wherein said at least one support bar extends upward at about 5°–15° incline to the vertical direction.

9. The tool cart of claim 8, wherein said at least one support bar extends upward at about a 7° incline to the vertical direction.

10. The tool cart of claim 4, further including a cup holder attached to the at least one support bar.

11. A tool holder for at least one tool having a working end and a handle, the tool holder comprising:

a gripping device adapted to engage the handle of the at least one tool;

a base adapted to support the working end of the at least one tool, the base comprising an irregular surface including an arrangement of slots extending through the base and a plurality of substantially identical raised projections spaced to accommodate tools of various sizes, wherein the irregular surface is adapted to contact an edge of the working end of the at least one tool, thereby restricting movement of the working end of the at least one tool along the base; and a substantially vertical structural support connected to said gripping device and said base for supporting said gripping device vertically upward from said base;

a crossbar connected to said substantially vertical structural support and spaced from said base for positioning said gripping device relative to said base;

an alignment device for the handle of the at least one tool, and a lower crossbar connected to said substantially vertical structural support and spaced from said base and from said upper crossbar for positioning said alignment device relative to said base;

wherein said gripping device comprises a series of adjacent clamps and is attached to said upper crossbar, and said alignment device comprises a series of adjacent notches and is attached to said lower crossbar, and said clamps and said notches are respectively substantially vertically aligned to effectively hold the handle of a plurality of tools.

12. The tool holder of claim 11, wherein at least one of said clamps has a wide clamping area and a narrow clamping area, and at least one of said notches has a wide notch area substantially vertically aligned with said wide clamping area and a narrow notch area substantially vertically aligned with said narrow clamping area.

* * * * *